March 15, 1949.  C. WELDON ET AL  2,464,424
TRACTOR COUPLER
Filed March 13, 1947
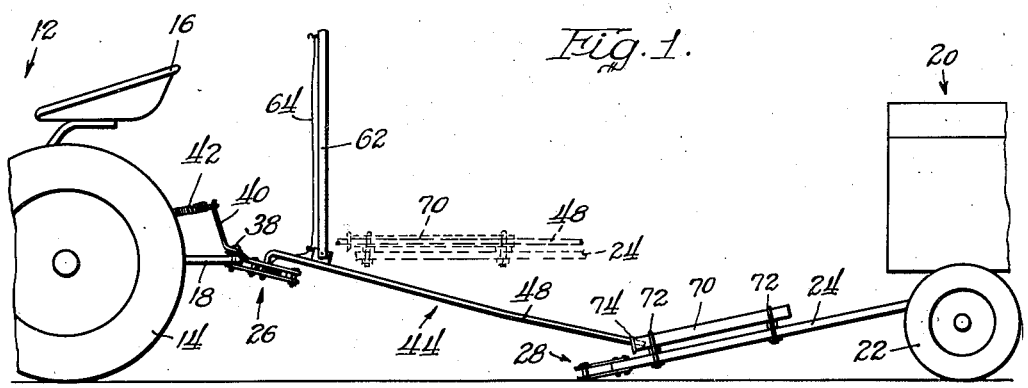
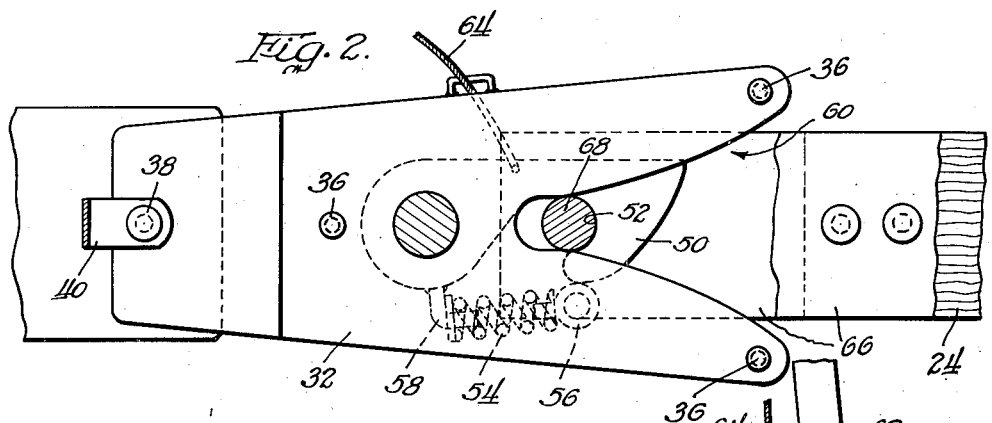
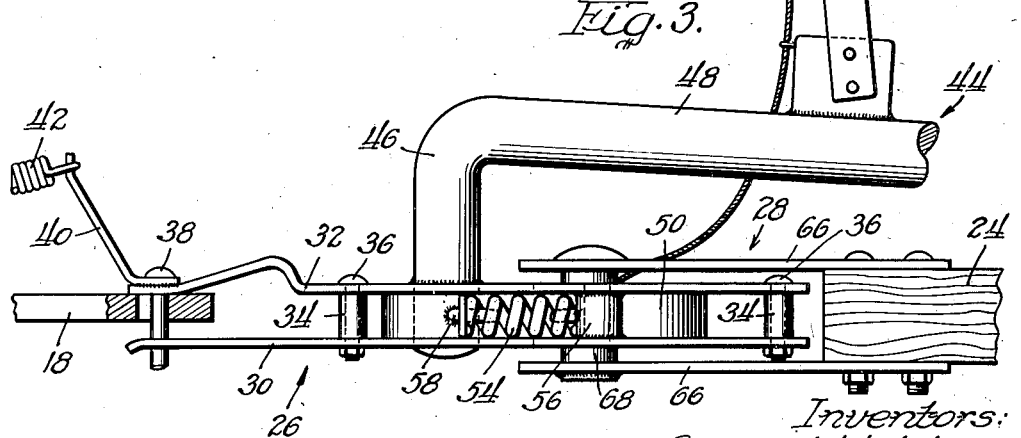
Inventors:
Conrad Weldon,
Lyle E. Weldon.
By Bair & Freeman
Attys.

Patented Mar. 15, 1949

2,464,424

UNITED STATES PATENT OFFICE 2,464,424

TRACTOR COUPLER

Conrad Weldon and Lyle E. Weldon,
Mitchellville, Iowa

Application March 13, 1947, Serial No. 734,348

3 Claims. (Cl. 280—33.15)

This invention relates to a coupler device for connecting a traction vehicle and a trailer vehicle.

The invention has particular applicability to a traction vehicle in which the operator's station is positioned at the rear thereof.

A great difficulty encountered in the case of previous types of coupler devices was that the operator of the traction vehicle was required to dismount from the vehicle in order to connect the coupler device. This was inconvenient for the operator and it was time consuming.

Another disadvantage in the operator's necessity of dismounting from the tractor, was that it was difficult to effectively connect the coupler because the operator could not "spot" the traction vehicle at exactly the correct place. It was then necessary to manhandle one vehicle or the other.

An object, therefore, of the present invention is the provision of a coupler means in which the operator of the traction vehicle can connect the coupler without dismounting from his station.

Another object of the invention is the provision of a coupler means having guiding elements for aligning the members of the coupler by the movement of the traction vehicle backward toward the trailer vehicle.

A further object of the invention is the provision of means enabling the operator to easily control the guiding means in the initial movement of the traction vehicle, after which continued movement of the traction vehicle guides the coupler members into alignment.

With these and other objects in view, our invention consists in the construction, arrangement and combination of the various parts of our device whereby the objects contemplated are attained as hereinafter more fully set forth, pointed out in our claims and illustrated in the accompanying drawings, wherein:

Figure 1 is a side view of the portion of a traction vehicle and a portion of a trailer vehicle, to which the coupler of my invention is attached, in the position just previous to the coupling operation;

Figure 2 is a plan view, on an enlarged scale, of a portion of the coupler device of the present invention; and Figure 3 is a side view of Figure 2.

Referring now in detail to the drawings, at the left of Figure 1 is illustrated a traction vehicle 12, as represented by the rear wheels 14, operator's station 16, and drawbar 18.

At the right of Figure 1 is illustrated a trailer vehicle 20 having front wheels 22. A tongue 24 leads forwardly from the front axle of the vehicle. The vehicle 20 is a conventional farm wagon and it will be understood that the tongue 24 is secured to the front axle and swingable up and down thereon, and the front axle is swingable on a vertical axis for guiding the wagon.

One coupler member indicated generally at 26 is secured to the drawbar 18 of the traction vehicle, and a second coupler member indicated generally at 28 is secured to the tongue 24 of the trailer vehicle. The tongue 24 and coupler member 28 together will be referred to at times as a coupler member.

The coupler member 28 comprises a bottom plate 30 and a top plate 32 secured together in spaced relation by spacers 34 and bolts 36. A pin 38 is inserted through holes in the leading ends of the plates 30 and 32 and through the drawbar 18 of the traction vehicle. The spacing of the forward ends of the plates 30 and 32 is greater than the thickness of the drawbar 18 to enable the coupler member 26 to swing downwardly to a limited extent. An arm 40 is secured, preferably by welding, to the forward end of the upper plate 32 and extends forwardly and upwardly. At the upper end of the arm 40 a tension spring 42 is attached, the other end of the tension spring being secured to the frame of the traction vehicle 12.

A guide rod shown generally at 44, having a short upright portion 46 and a horizontal long portion 48, is secured to the coupler member 26. The portion 46 is inserted in an opening in the plates 30 and 32 and secured therein as by riveting or welding. The longer portion 48 of the guide rod 44 is positioned in spaced relation above the coupler member 26 and extends a considerable distance rearwardly therebeyond.

A latch dog 50 is positioned between the plates 30 and 32 and pivoted therein for swinging movement. The present illustration shows the latch dog 50 pivoted on the vertical portion 46 of the guide rod 44, but it will be understood that other means may be provided for such pivotal mounting. The latch dog 50 is a conventional element having a notched portion 52 for latching a cooperating member as will be explained later. A compression spring 54 is biased between one of the spacers indicated at 56, between the plates 30 and 32, and a lug 58 on the latch dog 50. The spring 54 biases the latch dog 50 in a clockwise direction.

The rear end of the plates 30 and 32 are formed with registering recesses 60 in the form of forwardly converging notches, terminating forwardly at a point to the left of the notch 52 in the latch dog 50.

A handle member 62 is rigidly secured to the guide rod 44 adjacent the forward end thereof and extends upwardly to a point within easy reach of the operator when sitting in the seat 16 of the traction vehicle. A flexible cord 64 is secured to the upper end of the handle member 62 and leads down between the plates 30 and 32 and is connected at its other end to the latch dog 50. The flexible cord 64 is also within easy reach of the operator when seated on the traction vehicle, and by pulling the latch cord 64 the latch dog 50 can be unlatched.

The coupler member 28 comprises a pair of plates 66, one secured to the under surface of the tongue 24 and the other secured to the upper surface, and both extending forwardly beyond the forward end of the tongue. Adjacent the forward end of the plates 66 is a latch pin 68 extending between the plates 66 and rigidly secured therein as by riveting or welding. The plates 66 of the coupler member 28, it will be noted, are placed farther apart than the plates 30 and 32 of the coupler member 26.

A tubular guiding element 70 is secured to the tongue 24 of the trailer vehicle rearwardly of the coupler member 28, by means of U bolts, and spaced upwardly slightly above the tongue. The tubular guiding element 70 is a hollow tube of considerably greater diameter than the guide rod 44 and is provided at its forward end with an outwardly flaring portion 74.

As mentioned above, the coupler member 26 is permitted some degree of vertical swinging. The coupler member 26 is also swingable about the pin 38 as an axis. The tension spring 42 biases the coupler member 26 upwardly tending to retain the coupler member in horizontal position.

Figure 1 shows the tongue of the trailer vehicle lowered and resting on the ground. When the operator of the traction vehicle wishes to connect the coupler, he reaches the handle member 62 and by swinging rearwardly on it swings the rear end of the guide rod 44 downwardly. He then backs the traction vehicle toward the trailer vehicle, and by means of the handle member 62, guides the guide rod 44 into the tubular element 70. The flared portion 74 assists in guiding the guide rod into the tubular element. On continued backing of the traction vehicle toward the trailer vehicle, the guide rod 44 is telescoped into the tubular guide element 70, and as the two vehicles approach each other the tongue 24 of the trailer vehicle is raised to horizontal position as indicated in dotted lines in Figure 1. The guide rod 44 also aligns the tongue of the trailer vehicle laterally with the coupler member 26.

Thus it will be seen that the operator of the traction vehicle need not dismount from the vehicle to connect the coupler device.

The wide dimension of the rear portion of the recesses 60 aids in guiding the latch pin 68 into proper position in the coupler member 26. The latching pin 68 acting on the curved front surface of the latch dog 50 swings the latch dog out of latched position, and when the pin 68 passes the hook portion of the latch dog 50 the spring 54 swings the latch dog 50 clockwise into latched position as shown in Figure 2. When the operator wishes to unlatch the coupler device he merely pulls on the flexible cord 64 to swing the latch dog 50 out of latching position.

While we have herein shown and described a preferred embodiment of our invention, manifestly it is susceptible of modification and rearrangement of the parts without departing from the spirit and scope thereof. We do not, therefore, wish to be understood as limiting our invention to the precise form herein disclosed, except as we may be so limited by the appended claims.

We claim as our invention:

1. In a device for coupling a traction vehicle and a trailer vehicle, the combination comprising, a coupler member adapted to be applied to each of the vehicles, each of said coupler members having swinging movement, a guide rod secured to the coupler member on the traction vehicle, said guide rod being spaced above its coupler member and extending longitudinally beyond the swingable end thereof, and a tubular guide element secured to the coupler member on the trailer vehicle, said tubular guide element being spaced above its coupler member, said guide rod adapted to telescope into said tubular guide element for aligning said coupler members when the vehicles are moved together.

2. In a device for coupling a traction vehicle and a trailer vehicle, the combination comprising, a coupler member adapted to be applied to each of the vehicles, said coupler members having intercooperating latching portions, each of said coupler members having swinging movement, an elongated guide rod secured to one of said coupler members in laterally spaced relation thereto and extending longitudinally beyond the respective latching portion, and an elongated tubular guide element secured to the other of said coupler members in laterally spaced relation thereto and extending longitudinally beyond the respective latching portion in the same direction as said guide rod, said guide rod adapted to telescope into said tubular guide element for aligning said coupler members when the vehicles are moved together.

3. In a device for coupling a traction vehicle and a trailer vehicle, the combination comprising, a first coupler member adapted to be applied to the traction vehicle, a second coupler member adapted to be applied to the trailer vehicle, said coupler members having intercooperating latching portions, each of said coupler members having swinging movements, yieldable means biasing said first coupler member upwardly to horizontal position, upwardly extending handle means rigidly secured to said first coupler member, an elongated guide element secured to each of said coupler members and positioned laterally from and extending longitudinally in the same direction beyond the respective latching portions, said guide elements intercooperating for aligning said coupler members when the vehicles are moved together.

CONRAD WELDON.
LYLE E. WELDON.

REFERENCES CITED

The following references are of record in the file of this patent:

UNITED STATES PATENTS

| Number | Name | Date |
| --- | --- | --- |
| 751,471 | Decker | Feb. 9, 1904 |
| 784,927 | Crisler | Mar. 14, 1905 |
| 1,365,013 | Wright | Jan. 11, 1921 |
| 2,062,788 | Jacob | Dec. 1, 1936 |
| 2,399,364 | Lewison | Apr. 30, 1946 |